May 6, 1969  H. H. SPECHT  3,442,741
METHOD FOR MAKING SATELLITE STRUCTURE
Filed Oct. 3, 1962  Sheet 1 of 2

INVENTOR
HERBERT H. SPECHT
BY
ATTORNEYS

May 6, 1969     H. H. SPECHT     3,442,741
METHOD FOR MAKING SATELLITE STRUCTURE
Filed Oct. 3, 1962     Sheet 2 of 2

INVENTOR
HERBERT H. SPECHT

BY
ATTORNEYS

United States Patent Office 3,442,741
Patented May 6, 1969

3,442,741
METHOD FOR MAKING SATELLITE STRUCTURE
Herbert H. Specht, Dayton, Ohio, assignor to Avco Corporation, Cincinnati, Ohio, a corporation of Delaware
Filed Oct. 3, 1962, Ser. No. 228,134
Int. Cl. B32b 31/12; C09j 5/06
U.S. Cl. 156—229                                    4 Claims

ABSTRACT OF THE DISCLOSURE

The invention is a method of making a body of predetermined configuration capable of being collapsed into a minimum geometric space by external means but also capable of reassuming the predetermined configuration when such external means are removed. The method comprises laminating special polyethylene and polyester sheets together with a thermosetting resinous adhesive and with metal foil and preshaping the assembly under conditions of heat and pressure that cause the adhesive to set with certain parts under tension and others under compression, with the assembly thereafter seeking to maintain an equilibrium in said predetermined configuration.

---

This invention relates to an improved satellite structure and to the method of making the same as well as to an improved lamination for making such a structure or the like and to an improved method for making such a lamination or the like.

It is well known that certain satellites for use in outer space are too large in their erected form to be carried by rockets from the earth to the desired position in outer space.

Therefore, such satellite structures are so manufactured that the same can be contained in a collapsed form while being transported by a rocket or the like from the earth to outer space where the collapsed satellite is expanded by internal pressure to its erected condition.

Such prior known method is only satisfactory when the desired erected shape of the satellite is substantially a sphere because the internal pressure of the satellite acts symmetrically on the erected satellite and will hold the satellite walls in the desired spherical configuration.

Such prior known inflating method, however, will not permit a satellite to be erected into shapes other than spheres.

For example, it is well known that it is desired to provide a parabolic sector of a relatively large size for reflecting rays from the sun or the like to a desired location or for acting as an antenna, radar reflector and the like.

According to the teachings of this invention, relatively light weight and relatively large satellites can be provided which have configurations other than spheres, although the same can form spheres, and are readily adapted to be disposed in collapsed compact forms to be easily transported from earth to outer space where the satellites can be automatically erected to their desired configurations and remain in their desired configurations for an unlimited amount of time.

In particular, one feature of this invention is to provide a wall structure for such a satellite or the like wherein the collapsed wall structure can be moved to its preformed shape in a relatively easy manner and, when the wall structure is moved to its preformed shape, the wall structure substantially rigidifies to hold the preformed shape in a manner heretofore unattainable in the art.

Accordingly, it is an object of this invention to provide an improved satellite or the like having one or more of the novel features of this invention set forth above or hereinafter shown or described.

Another object of this invention is to provide an improved method for making such a satellite or the like.

A further object of this invention is to provide an improved lamination for forming such a satellite or the like.

Another object of this invention is to provide an improved method for making such a lamination or the like.

Other objects, uses and advantages of this invention are apparent from a reading of this description which proceeds with reference to the accompanying drawings forming a part thereof and wherein.

Figure 1:
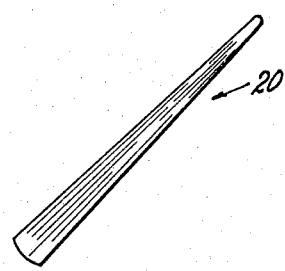
FIGURE 1 is a schematic perspective view illustrating the improved satellite of this invention in its compact collapsed form.

While the various features of this invention are hereinafter described and illustrated as being particularly adaptable for forming satellites and the like, it is to be understood that the various features of this invention can be utilized singly or in any combination thereof to provide other structures as desired.

Therefore, this invention is not to be limited to only the embodiments illustrated in the drawings, because the drawings are merely utilized to illustrate one of the wide variety of uses of this invention.

Figure 2:
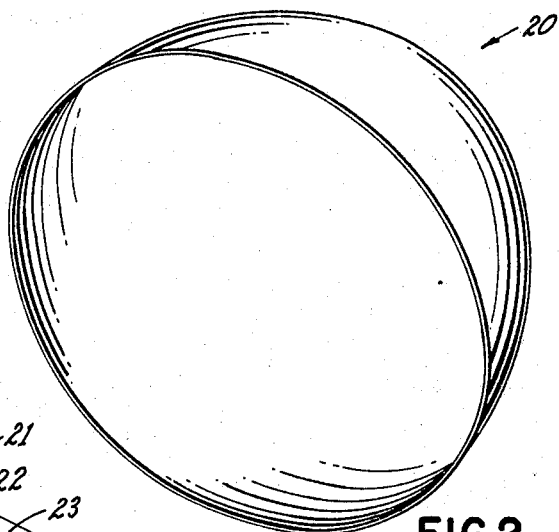
FIGURE 2 is a perspective view illustrating the satellite of FIGURE 1 in its erected and rigidified form.

Referring now to FIGURES 1 and 2, the improved satellite of this invention is generally indicated by the reference numeral 20 and, when the satellite 20 is disposed in its erected form in a manner hereinafter described, the satellite 20 of this invention forms a substantially parabolic sector as illustrated in FIGURE 2 and is automatically rigidified in this erected configuration in a manner hereinafter described.

The satellite 20 of this invention is adapted to be initially disposed in the substantially collapsed umbrella form illustrated in FIGURE 1 when formed by the method of this invention to permit the same to be transported in the collapsed form illustrated in FIGURE 1 by a rocket or the like from Earth to outer space whereby the collapsed satellite 20 can be erected to the parabolic form illustrated in FIGURE 2 in a relatively simple manner and remain in the configuration illustrated in FIGURE 2 by having the walls thereof substantially rigidified in a manner hereinafter described.

For example, the erected satellite 20 can have a diameter of approximately eight feet with a focal length of approximately forty inches while the collapsed satellite 20 can be stored and transported in a tube or cylinder about five feet long and fifteen inches in diameter.

The satellite 20 of this invention can be initially formed in the collapsed form illustrated in FIGURE 1 and can be erected in outer space to the configuration illustrated in FIGURE 2 because the walls forming the satellite 20 are formed from a unique lamination of this invention which permits the walls of the satellite 20 to have one configuration when initially formed and to asume another configuration when erected, the walls being rigidified when erected to hold the satellite 20 in the desired configuration.

Figure 3:
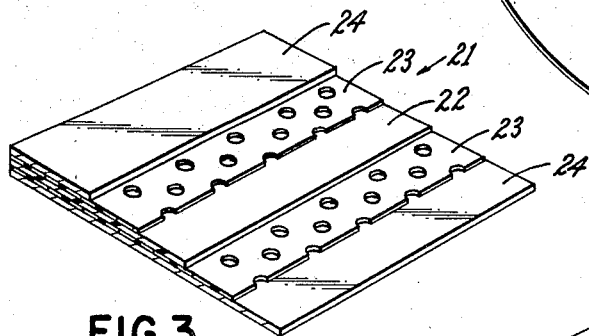
FIGURE 3 is an enlarged, fragmentary, perspective view illustrating one embodiment of the lamination of this invention for forming the satellite of FIGURE 1.

One such lamination is illustrated in FIGURE 3 and is generally indicated by the reference numeral 21.

The lamination 21 comprises a core formed from a sheet of Mylar 22 having the opposed sides thereof laminated to sheets of perforated polyethylene 23 by a suitable adhesive in a manner hereinafter described.

The sheets of polyethylene 23 are in turn laminated to opposed sheets of aluminum foil 24 by a suitable adhesive in a manner hereinafter described to complete the lamination 21.

One method for forming the lamination 21 to produce the walls of the satellite 20 is illustrated schematically in FIGURES 5–7 and will now be described.

Figure 5:
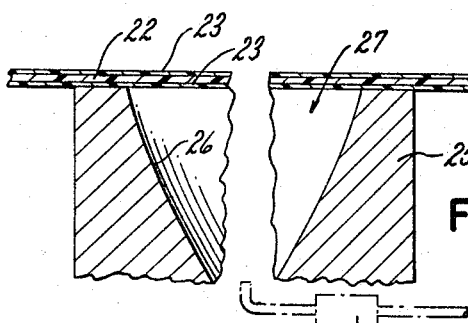
FIGURES 5–7 are cross-sectional views illustrating one method for forming the lamination of FIGURE 3.

As illustrated in FIGURE 5, a female vacuum die 25 is provided having a wall 26 of the desired contour for forming part of the exterior wall means of the erected satellite 20.

A sheet of Mylar 22 is laminated to opposed sheets of polyethylene 23 by first roll coating both sides of the sheets of polyethylene 23 with a suitable Bakelite type resin. Thereafter, the coated polyethylene sheets 23 are heated sufficiently to effect a set of the Bakelite type resin.

The sheets of the heated polyethylene 23 are placed on each side of the sheet of Mylar 22 to be bonded thereto.

Subsequently the three-layer sandwich is placed over the top of the female die 25 in the manner illustrated in FIGURE 5 to close the cavity 27 thereof.

Figure 6:
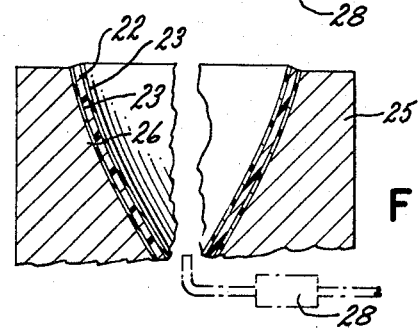

Thereafter, the cavity 27 is evacuated by a vacuum pump 28 or the like to draw the three-layer sandwich down into the mold cavity 27 in the manner illustrated in FIGURE 6 whereby the three-layer sandwich conforms to the surface 26 of the die apparatus 25.

With the sandwich being held in the position illustrated in FIGURE 6, the sandwich is heated sufficiently to not only cause the polyethylene to be secured to the Mylar 22 by the resin adhesive, but also to cause the sheet of Mylar 22 to be thermally set in the concave configuration so that regardless of the subsequently folded condition of the lamination 21, the sheet of Mylar 22 will always tend to return to the size and shape produced by the die apparatus 25.

Thereafter, the three layer sandwich is removed from the die apparatus 25 and is laminated to the aluminum sheets 24 in a manner now to be described.

Figure 7:
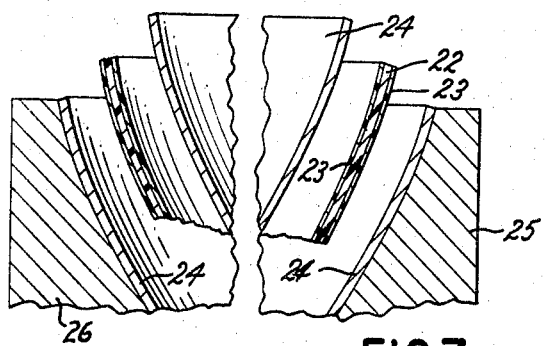

In particular, a preformed sheet of aluminum foil 24 is placed against the surface 26 of the die apparatus 25 in the manner illustrated in FIGURE 7 with the sheet of aluminum foil 24 being sufficiently heated so that the sheet of aluminum foil 24 is substantially elongated from its natural size.

Figure 8:
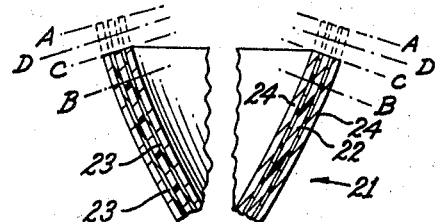
FIGURE 8 is a cross-sectional view illustrating the lamination of FIGURE 3 in the various operating positions thereof.

While the lower sheet of aluminum foil 24 is so heated, the three layer sandwich, comprising the Mylar sheet 22 and polyethylene sheets 23, is disposed on top of the heated sheet of aluminum foil 24 in the manner illustrated in FIGURE 7 while another sheet of heated aluminum foil 24 is placed against the other side of the three sheet lamination so that the heat from the sheets of aluminum foil 24 causes the Bakelite type resin on the polyethylene sheets 23 to bond the sheets of aluminum foil 24 thereto to form the lamination as illustrated in FIGURE 8.

Because the lamination 21 illustrated in FIGURE 7 was formed while the Mylar sheet 22 was at room temperature and while the aluminum sheets 24 were heated and, thus, elongated, the completed lamination 21 extends to the lines A, FIGURE 8, when initially formed, the lines A corresponding to the natural size of the sheet of Mylar 22.

However as the aluminum foil 24 cools down to room temperature, the aluminum foil 24 tends to return to its natural size as defined between the lines B in FIGURE 8.

However, the sheets of aluminum foil 24 cannot return to their natural size because the Mylar 22 is opposing such movement whereby the entire lamination 21 only returns to the position between the lines C in FIGURE 8. In this manner, the Mylar sheet 22 is placed under compression and the sheets of aluminum foil 24 remain under tension.

Thus, it can be seen that the sheet of Mylar 22 is normally tending to return the lamination 21 to the position illustrated by the lines A while the sheets of aluminum foil 24 are preventing the same.

Therefore, the satellite 20 is initially formed from the laminations 21 while the same are disposed between the lines C illustrated in FIGURE 8.

Thereafter, the completed satellite 20 is collapsed to the position illustrated in FIGURE 1 and stored in such position until it is desired to send the same into outer space.

When the satellite 20 is sent into outer space, the satellite 20 is erected by expanding a gas or the like inside the satellite 20 to create a pressure inside the satellite 20 which will cause the same to expand to the configuration illustrated in FIGURE 2 and cause the walls or laminations 21 thereof to stretch in a manner now to be described.

In particular, the inflating pressure is so controlled that the same causes the laminations 21 to stretch to the position illustrated by the lines A in FIGURE 8 whereby the Mylar sheet 22 is permitted to return to its natural size and configuration while causing the sheets of aluminum foil 24 to also stretch to the lines A.

However, because the sheets of aluminum foil 24 are stretching to the lines A while the sheets of aluminum foil 24 are cold and not heated, the sheets of aluminum foil 24 stretch beyond their yield points as represented by the lines D, but below their rupture points, whereby the sheets of aluminum foil 24 rigidify in their new position as represented by lines A to provide rigidity to the lamination 21.

In this manner, the rigidified aluminum foil sheets 24 in combinaiton with the preformed shape of the Mylar sheet 22 cause the walls 21 of the satellite 20 to remain in the parabolic sector configuration as illustrated in FIGURE 2 in a manner heretofore unattainable in the art.

Thus, the internal pressure initially used to erect the satellite 20 can be taken away, such as by expelling the same from the satellite 20 and the satellite 20 will remain in the configuration illustrated in FIGURE 2 because of the rigidified aluminum foil sheets 24 and the preformed shape of the Mylar sheets 22.

It is believed that such differential movements between the aluminum sheets 24 and the Mylar sheet 22 can only be accomplished by having the relatively flexible sheets of polyethylene 23 laminated therebetween to act as sheets of lubrication between the foil 24 and Mylar 22 to prevent tearing of the sheets 22 and 24 during the differential movements therebetween.

Also, the perforations in the polyethylene sheets 23 permit the sheets 23 to be placed under compression and tension during such movements without adversely effecting the cross-sectional thickness of the lamination 21 or the smoothness of the exposed surfaces of the foil sheets 24.

Further, it has been found that while Mylar has a high tensile strength, the same has a low tear strength.

However, since the polyethylene sheets 23 have high tear strength but low tensile strength, the combination of the Mylar and polyethylene, when utilized with the aluminum foil 24, provides a substantially stable lamination which permits the formation of a relatively large satellite from a relatively thin sheet of material, the satellite being adapted to be formed in any desired configuration in a manner heretofore unattainable in the art.

While the various sheets formings the lamination 21 can have any desired thicknesses, it is preferred that the same be relatively small to produce a light weight structure.

For example, the sheets of aluminum foil 24 can have an approximate thickness of 0.001 of an inch, the sheets of polyethylene 23 can have an approximate thickness of 0.0005 of an inch and the sheet of Mylar 22 can have approximate thickness of 0.001 of an inch.

Therefore, it can be seen that the entire lamination 21 is relatively thin whereby the same has a relatively light weight while still permitting the satellite 20 to be relatively large and substantially rigid when erected into the configuration illustrated in FIGURE 2.

Accordingly, it can be seen that the principle involved to permit a satellite to be initially formed in a collapsed condition and be sent in outer space and erected in outer space to a configuration other than a sphere is the utilization of metallic foil or the like which is initially flexible so that the satellite can be readily collapsed and which can be subsequently stretched in outer space beyond its yield point, but below its rupture point, to permit the same to rigidify in a preformed shape to hold the satellite in its desired configuration without requiring a steady source of internal pressure or the like, the preformed Mylar controlling the shape of the rigidified satellite.

While one form of lamination 21 has been described and illustrated, it is to be understood that other forms of lamination can be utilized while still following the teachings of this invention.

Figure 4:
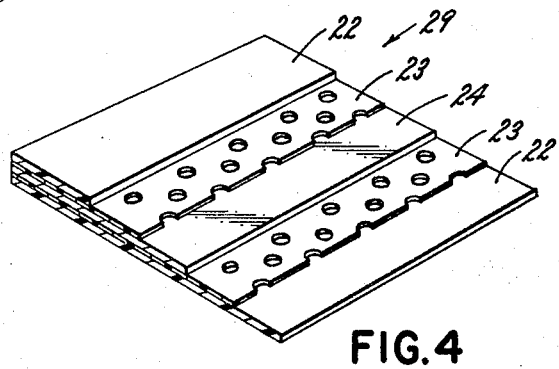
FIGURE 4 is a view similar to FIGURE 3 illustrating another lamination of this invention.

For example, reference is made to FIGURE 4 wherein another lamination of this invention is generally indicated by the reference numeral 29 and comprises a core formed of a sheet of aluminum foil 24 laminated on opposed sides thereof to perforated sheets of polyethylene 23. A pair of opposed Mylar sheets 22 are laminated on the opposite sides of the polyethylene sheets 23 to complete the lamination 29, the lamination 29 reacting in substantially the same manner as the lamination 21 to permit the satellite 20 to be erected in the form illustrated in FIGURE 2 and have the walls thereof rigidified in a unique form to hold the satellite 20 in its desired configuration.

Figure 9:
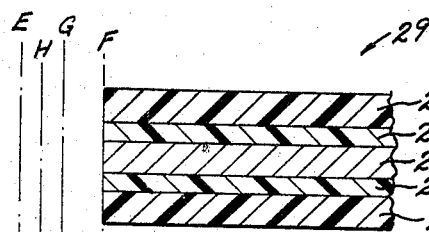
FIGURES 9–11 are cross-sectional views illustrating the lamination of FIGURE 4 in the various operating positions thereof.
Figure 10:
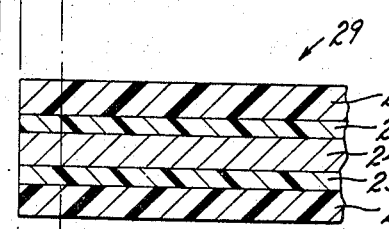
Figure 11:
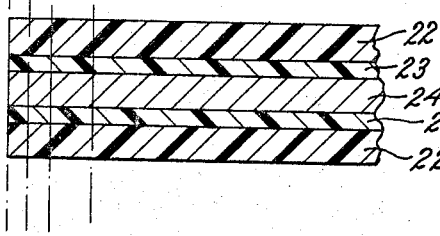

One method for making the lamination 29 illustrated in FIGURE 4 is illustrated in FIGURES 9–11 and will now be described.

First, the sheets of Mylar 22, when at room temperature, normally extend to the line E in FIGURES 9–11 but, when sufficiently cooled, the same only extend to the line F.

When the preformed sheets of Mylar 22 are sufficiently cooled, the same are laminated to the polyethylene sheets 23 and aluminum sheet 24 while the aluminum sheet 24 is at room temperature to provide the sandwich illustrated in FIGURE 9 in the manner previously described.

As the sheets of Mylar 22 begin to heat up to room temperature, the same tend to extend back to the line E, but, because of the aluminum sheet 24, the lamination 29 only extends to the line G whereby the sheets of Mylar 22 are placed in compression and the aluminum sheet 24 is placed in tension.

Therefore, the lamination 29 assumes the position illustrated in FIGURE 10 whereby the laminations 29, as illustrated in FIGURE 10, are utilized to form the satellite 20 which is adapted to be disposed in the collapsed position illustrated in FIGURE 1 because the aluminum foil 24 is relatively flexible.

When such a formed and collapsed satellite 20 is shot into outer space and is expanded by internal pressure or the like, in the manner previously described, the internal pressure tends to stretch the laminations 29 to the position illustrated in FIGURE 11 whereby the sheets of Mylar 22 extend back to their normal size as illustrated in FIGURE 11 and cause the sheet of aluminum foil 24 to stretch beyond its yield point as represented by the line H, but below its rupture point, to substantially rigidify in the configuration illustrated in FIGURE 11 to provide sufficient rigidity to the satellite 20 to permit the same to remain in its configuration even though the internal pressure is subsequnetly removed.

As previously stated the invention is not limited to satellites or the like but may be utilized in other ways. The present structure may be used to form large antennas or huts which could be readily transported to remote areas and then set up. For example, such structures could be air dropped or shot by rockets or guns into remote areas such as the Arctic or Antarctic and thereafter set up.

In view of the present structures high strength to weigh ratio, large quantities thereof may be transported without incurring the usual weight and volume problems.

What is claimed is:

1. The method of making a body of predetermined configuration capable of being collapsed into a minimum geometric space by external means but simultaneously capable of assuming a predetermined configuration when such external means are removed, comprising:
    applying a thermosetting resinous adhesive to a sheet of polyethylene material,
    applying thereto a sheet of polyester material,
    shaping the sandwich thus formed into a predetermined configuration,
    applying heat thereto to adhere and simultaneously thermally set the adhesive,
    laminating a heated aluminum foil to the shaped assembly,
    and finally cooling said foil, whereby the tendency of the metal foil to shrink is opposed by the polyester and the assembly, when free of external influences returns to a position of equilibrium in said predetermined configuration with said foil being under tension and said polyester being under compression.

2. The method of claim 1 in which the polyethylene material contains perforations.

3. The method of making a body of predetermined configuration capable of being collapsed into a minimum geometric space by external means but simultaneously capable of assuming a predetermined configuration when such external means are removed, comprising:
    providing a polyethylene sheet containing perforations;
    applying thereto a thermosetting resinous adhesive,
    heating said adhesive-coated sheet to a temperature sufficient to initiate a set to said adhesive,
    superimposing thereon a polyester sheet having a high shear strength,
    shaping the sandwich thus formed into the desired predetermined configuration,
    heating the shaped sandwich to cause the polyethylene and polyester layers to adhere and to thermally set in said predetermined configuration,
    laminating a heated metal foil to the formed assembly,
    and finally cooling said foil whereby the tendency of the metal foil to shrink is opposed by the polyester sheet and the assembly returns to a position of equilibrium in said predetermined configuration with said foil being under tension and said polyester being under compression.

4. The method of claim 3 in which said shaping is accomplished by vacuum molding.

References Cited

UNITED STATES PATENTS

| | | | |
|---|---|---|---|
| 3,093,346 | 6/1963 | Faget et al. | |
| 3,020,660 | 2/1962 | Sherotto | 161—17 |
| 2,961,365 | 11/1960 | Sroog | 161—214 |
| 3,097,124 | 7/1963 | Denenberg | 161—113 |
| 2,175,125 | 10/1939 | Mack et al. | 156—229 |
| 2,755,217 | 7/1956 | Griffin | 156—229 |

MORRIS SUSSMAN, *Primary Examiner.*

W. A. POWELL, *Assistant Examiner.*

U.S. Cl. X.R.

156—245, 321, 322; 161—113, 231, 213; 244—1, 264—90, 101